April 19, 1932. W. E. DEAN 1,854,734
HOSE COUPLING
Filed Sept. 30, 1927
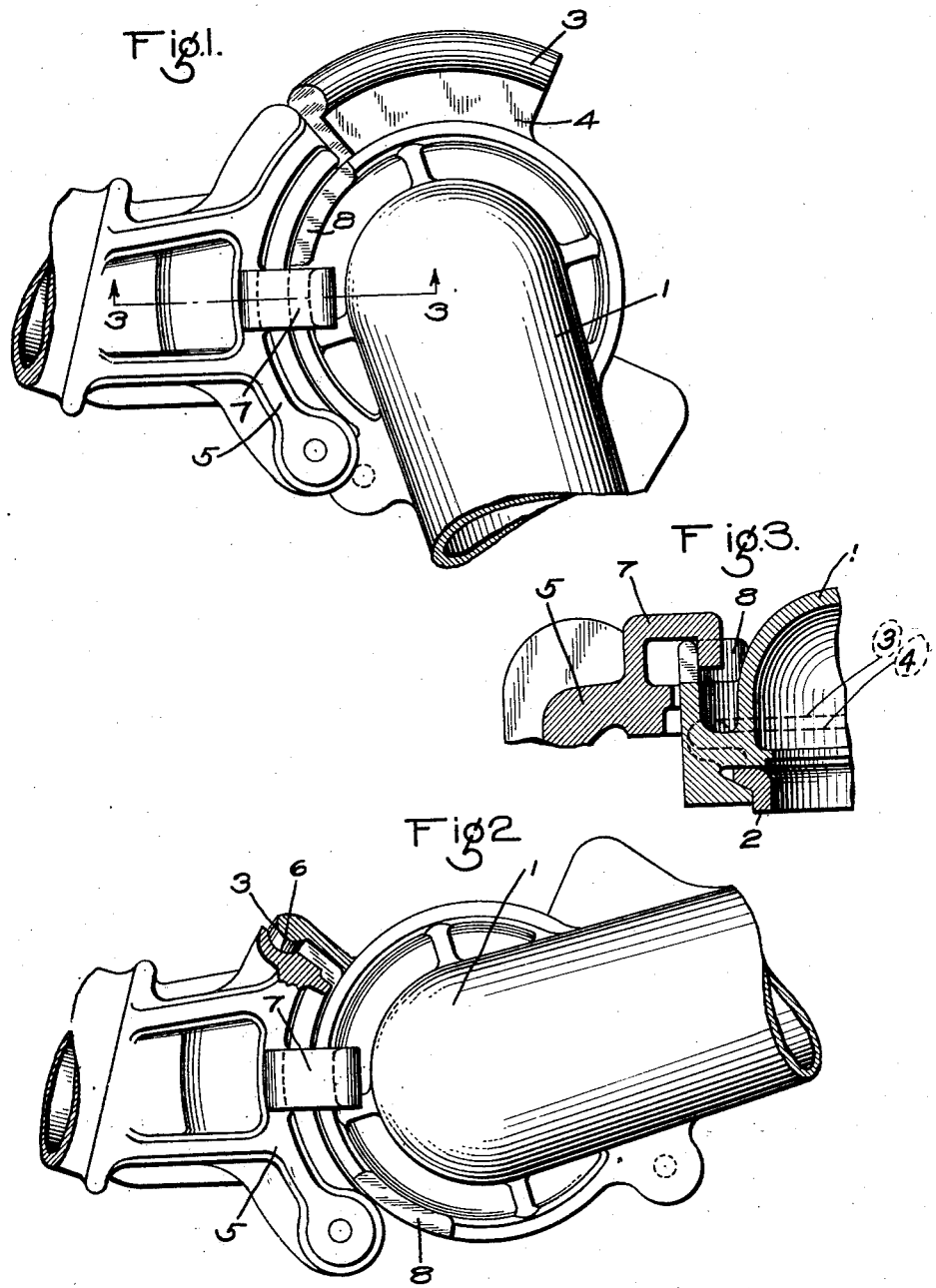
INVENTOR
WILLIAM E. DEAN
BY Wm. M. Cady
ATTORNEY Patented Apr. 19, 1932

1,854,734

UNITED STATES PATENT OFFICE

WILLIAM E. DEAN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

HOSE COUPLING

Application filed September 30, 1927. Serial No. 223,004.

This invention relates to hose couplings such as are employed to connect flexible hose ends between cars of a train.

The railway type of hand operated hose coupling is provided with a lateral opening surrounded by an annular gasket and having interlocking means comprising an arcuate rib and an arcuate groove disposed concentrically with the opening, the rib of one coupling head being adapted to engage the groove of a counterpart head when the coupling heads are relatively rotated while in engagement, so that the heads are locked together thereby, and the gaskets of the coupling heads are pressed into engagement.

With a coupling of the above type, it is possible and sometimes happens that the coupling heads are brought together in such a way that the gaskets engage while out of axial alinement and then when the heads are relatively rotated to interlock the heads, the gaskets are distorted by the interlocking movement which brings the lateral openings into axial alinement. As a result, the gaskets are clamped together in the coupled position, with the gaskets overlapped so that the area of the lateral opening is reduced and due to the distortion of the gaskets, leakage is liable to occur.

The principal object of my invention is to provide a hose coupling of the above type in which means are provided for insuring that counterpart coupling heads can only be brought into engagement for coupling together, with the gaskets in axial alinement.

In the accompanying drawings; Fig. 1 is a plan view of two coupling heads applied the one to the other, and constructed in accordance with my invention, and showing the coupling heads in position before the locking rib of one head engages in the groove of the other head; Fig. 2 a plan view of the coupling heads in the fully coupled position; and Fig. 3 a section on the line 3—3 of Fig. 1.

As shown in the drawings, the railway type of hose coupling comprises a body 1 having a lateral opening surrounded by a gasket 2 adapted to engage a corresponding gasket of a counterpart coupling, when the coupling heads are interlocked.

In order to interlock the coupling heads, the head is provided with an arcuate rib 3 which is formed on a projecting flange 4 at one side of and concentric with the lateral opening. On the opposite side of the lateral opening is provided an angular arm 5, on the inner face of which is formed an arcuate groove 6, in which the rib 3 of a counterpart coupling head is adapted to engage, when the coupling heads are brought together and relatively rotated one upon the other.

According to my invention, the annular arm 5 is provided with a hook 7 and on the outer side of the body 1 is provided a curved rib or latch 8 concentric with the annular opening of the head and adapted to engage within the hook.

The rib 8 is so positioned that when counterpart coupling heads are brought together for coupling up, as shown in Fig. 1, the rib 8 of one head must be in position to enter the hook 7 before the heads can be rotated to cause the rib 3 of one head to engage in the groove 6 of the other head.

With the rib 8 in position to enter the hook 7, the gaskets 2 will be in axial alinement, so that when the coupling heads are then rotated to cause the ribs 3 to interlock with the grooves 6 of the coupling heads, there will be no distortion of the gaskets.

After the coupling heads have been rotated to the coupled position, as shown in Fig. 2, the rib 8 will have been moved out of engagement with the hook 7, so that if cars should be pulled apart, the coupling heads between the cars can separate, as in the usual hose coupling.

While one illustrative embodiment of the invention has been described in detail, it is not my intention to limit its scope to that embodiment or otherwise than by the terms of the appended claim.

Having now described my invention, what I claim as new and desire to secure by Letters Patent, is:—

A hose coupling head having a lateral opening provided with a gasket, a curved rib, an angular arm having a curved groove, the rib of the coupling head being adapted to engage the groove of a counterpart coupling head, a hook carried by said arm, and a curved lug, the lug of the coupling head being adapted to engage the hook of a counterpart coupling head in advance of the engagement of the rib with the groove.

In testimony whereof I have hereunto set my hand.

WILLIAM E. DEAN.